United States Patent [19]

Zerna et al.

[11] 4,434,591
[45] Mar. 6, 1984

[54] COMPONENT USEFUL IN PRODUCING A COOLING TOWER

[75] Inventors: Wolfgang Zerna, Hattingen; Wilfried Krabbe, Buchschlag; Hans Schäfer, Darmstadt, all of Fed. Rep. of Germany

[73] Assignee: Philipp Holzmann AG, Frankfurt am Main, Fed. Rep. of Germany

[21] Appl. No.: 198,659

[22] Filed: Oct. 20, 1980

Related U.S. Application Data

[62] Division of Ser. No. 974,047, Dec. 28, 1978, abandoned.

[30] Foreign Application Priority Data

Dec. 30, 1977 [DE] Fed. Rep. of Germany ....... 2759087

[51] Int. Cl.³ .............................................. E04B 1/54
[52] U.S. Cl. ...................................... 52/73; 52/236.8; 52/607; 261/DIG. 11
[58] Field of Search ............... 52/236.8, 408, 406, 52/606, 607, 224, 283, 438, 437, 73; 261/DIG. 11; 264/32, 34, 33, 35

[56] References Cited

U.S. PATENT DOCUMENTS

| | | | |
|---|---|---|---|
| 674,874 | 5/1901 | Palmer | 52/607 |
| 3,006,377 | 10/1961 | Hamprecht | 52/246 |
| 3,017,723 | 1/1962 | Von Heidenstam | 264/34 |
| 3,427,777 | 2/1969 | Crowley | 52/246 |
| 3,468,087 | 9/1969 | Stancliffe | 52/246 |
| 3,501,882 | 3/1970 | Kobayashi | 52/438 |
| 3,566,557 | 3/1971 | Comolli | 52/73 |
| 3,764,121 | 10/1973 | Fordyce | 261/DIG. 11 |
| 3,804,260 | 4/1974 | Crowley | 52/224 |
| 4,255,363 | 3/1981 | Geiger | 52/246 |

FOREIGN PATENT DOCUMENTS

| | | | |
|---|---|---|---|
| 2209978 | 3/1972 | Fed. Rep. of Germany | 52/245 |
| 2712109 | 9/1978 | Fed. Rep. of Germany | 52/248 |

*Primary Examiner*—John E. Murtagh
*Attorney, Agent, or Firm*—Robert Scobey

[57] ABSTRACT

A cooling tower, a process for producing a cooling tower, and a reinforcing element suitable for use in the process and tower are disclosed. The cooling tower, formed from a shell of reinforced concrete, is produced with a plurality of plate-like reinforcing elements adjacent to a surface of the shell. The reinforcing elements are disposed in at least one horizontal plane within the shell adjacent to and suspended from the shell surface. The reinforcing elements in a plane abut and are joined one to another, and are also joined to the shell at spaced points thereon. Each plate-like element includes a central channel communicating with trough-like ends for receiving a suitable reinforcing material which extends into recesses in the shell of the cooling tower adjacent the trough-like ends.

7 Claims, 6 Drawing Figures

COMPONENT USEFUL IN PRODUCING A COOLING TOWER

This is a division of application Ser. No. 974,047, filed Dec 28, 1978.

BACKGROUND AND BRIEF DESCRIPTION OF THE INVENTION

This invention relates to the production of cooling towers. It has particular application to the production of cooling towers formed from annular reinforced shells of a desired curvature and made of reinforced concrete, sections of which are accessible by means of a ladder or a climable or movable shell. The invention is directly related to a process for the production of a cooling tower, as well as the cooling tower itself, and a reinforcing element for use in the process and the tower.

Cooling towers are used for recooling the cooling water of high-performance steam power plants. In "natural circulation" cooling towers, cooling air, because of a "chimney effect", flows upwardly through the tower. At a specified height, the cooling air is returned into the tower and cooled, by use of a wet coolant such as cooling water which is sprayed into the air or by use of a dry coolant used in a closed-circuit network.

Known cooling towers typcially take the form of a body of rotation. Natural draft cooling towers may take the form of a single-shell rotation hyperboloid, whose waist is in the upper third section of the tower.

Cooling towers made of reinforced concrete usually carry their load by the aid of a supporting framework and a suitable foundation adapted to ground conditions. The shell of the tower is usually erected on the site, capable of withstanding all loads and stresses that occur. Because the main stresses that occur are from the weight of the tower and from wind forces, the tower's ability to withstand buckling and vibration is of major importance.

Because of the steadily increasing performance of modern steam power plants, the need for cooling the air coolant is increasing. Whereas present day cooling towers generally have a maximum height of 170 meters and a maximum diameter of about 120 meters, future heights of 200 meters and base diameters of upwards of 150 meters are envisioned.

With existing cooling towers, the wall thickness of the shells in the waist portion is in the order of 16 to 18 centimeters. In the case of still larger cooling towers, in order to obtain adequate stability of the shell, it has been suggested that the shell be stiffened by horizontal stiffening rings. Because of constructional difficulties and high costs, an installation with horizontal stiffening rings has not been found to be practical in the past.

Accordingly, one of the main purposes of the invention is to create a process for producing a cooling tower and a cooling tower itself and a preformed reinforcing element useful in such production and tower. The towers to which the invention is directed are typically annularly reinforced shells of a desired meridian form, and the invention involves a relatively simple and inexpensive installation of reinforcing rings in the shells of such towers.

These objects are achieved in the present invention by the use of a plurality of plate-like reinforcing elements suspended from the shell in at least one horizontal plane by suspension elements connected to suspension locations on the shell above the plane, and preferably within a plurality of horizontal planes, with the reinforcing elements in each plane abutting and joined one to another and joined to the shell of the tower at spaced points thereon.

In accordance with a preferred embodiment of the invention, the shell of the cooling tower includes spaced-apart recesses in the form of slits passing partly or completely through the shell. The plate-like reinforcing elements are connected together and to the shell by the application of a suitable reinforcing material, such as concrete, which is bonded to the reinforcing elements, joining them one to another, and also filling the recesses so as to join the reinforcing elements to the shell.

The plate-like reinforcing elements useful in this invention are advantageously preformed with a middle solid region having a central channel therein which communicates with trough-like ends for receiving a suitable reinforcing material, such as concrete. That reinforcing material bonds to the reinforcing element and is used to join one element to another and the elements to the shell of the tower. The trough-like ends of the reinforcing elements thus constitute filigree plates integral with the middle solid region of the reinforcing element. The outer edge of that reinforcing element is advantageously bent upwardly; the inner edge of the reinforcing element adjacent to the tower shell includes a projection provided with a sealing element to produce a seal between the adjacent recess in the tower shell and the reinforcing element, to prevent the leakage of reinforcing material when that material is applied to the central channel and trough-like ends of the reinforcing element to join adjacent reinforcing elements together and to bond the reinforcing elements to the tower shell.

The preformed reinforcing elements are advantageously all of the same form. The channel referred to in the middle solid region of each element is upwardly open, and may include reinforcing rods therein for the strengthening of the element when the reinforcing material is poured therein. Anchorages are also included in the reinforcing elements used for suspending these elements from the tower. The reinforcing elements may also include other components mounted thereon useful in the cooling operation of the tower.

The reinforcing elements are preferably mounted in place by the use of a crane. The reinforcing elements may also be suspsended by hand from the lowest foothold within the tower itself.

A particular advantage of the invention is in the use of reinforcing elements which define stiffening rings in a cooling tower. The reinforcing elements abut one another, are made of the same general shape, and are only intermittently connected together and to the tower shell by suitable material, such as concrete. Because the reinforcing elements are suspended from the shell of the cooling tower, it is possible to complete the fabrication and installation of the stiffening rings in the tower independently of the building of the tower structure itself, thereby causing no delay in the tower construction.

The invention will be more completely understood by reference to the following detailed description.

DETAILED DESCRIPTION

Figure 1:
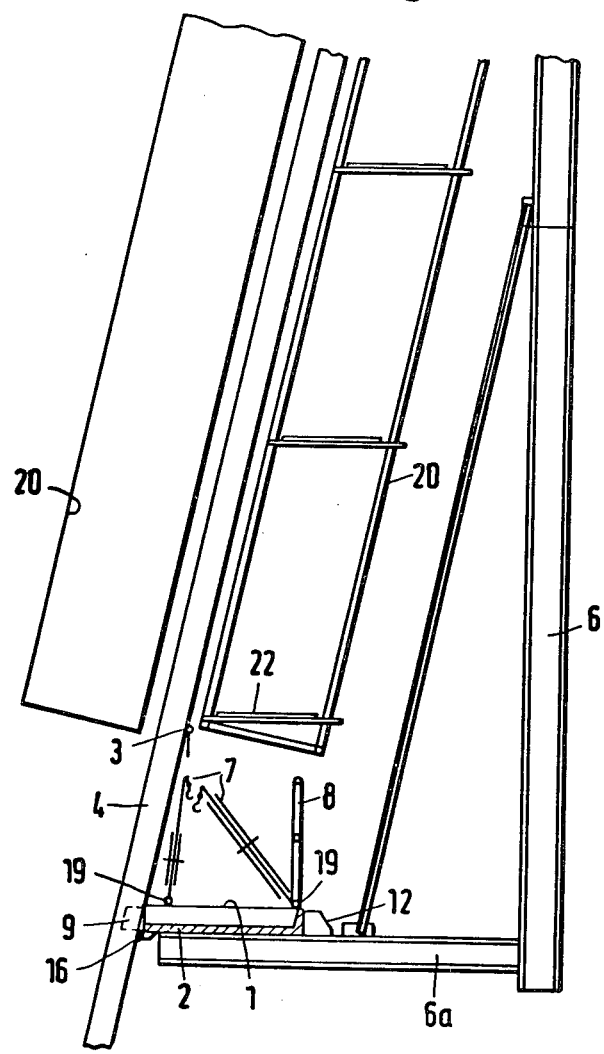
FIG. 1 shows the installation of a reinforcing element on a cooling tower shell.
Figure 2:
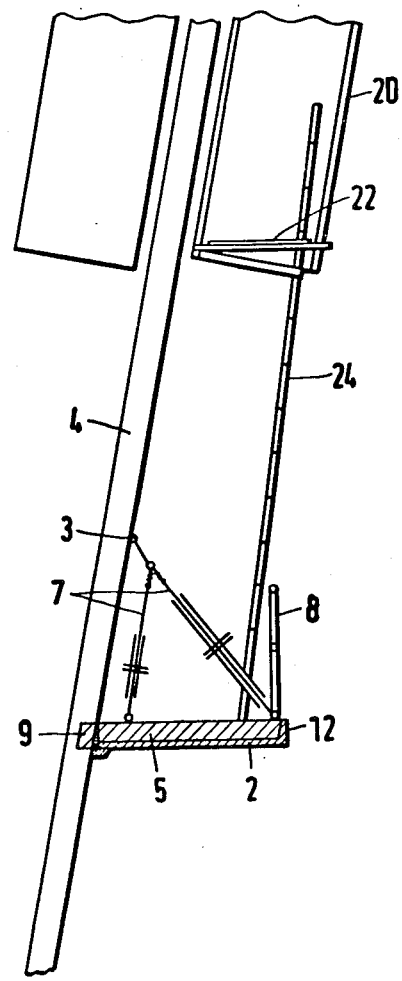
FIG. 2 shows, in a later stage of the process, a reinforcing element mounted on the tower shell.

FIGS. 1 and 2 show, at different stages of the process, the suspending of a preformed reinforcing element 1 inside a shell 4 of a cooling tower. The cooling tower is preferably formed of reinforced concrete, as is the reinforcing element. A "goose-beak" extension 6 of a crane is utilized, having a horizontal support surface 6a which supports the reinforcing element 1 during the installation of that element in the cooling tower. The reinforcing element 1 is mounted adjacent to the inside surface of the tower shell 4, extending inwardly from the shell. The reinforcing element includes a shell 2, preferably of concrete, which is open at its top portion and includes a border 12. A plurality of reinforcing elements 1 are utilized, advantageously arranged in an annular ring in a horizontal plane around the inside of the shell. The reinforcing elements 1 may be placed in a plurality of horizontal planes throughout the cooling tower.

Each reinforcing element 1 is suspended from the tower shell 4 by means of suspension elements 7, suspended from suspension locations 3 on the tower shell above the reinforcing element 1. The reinforcing elements 1 are also joined to the tower in the vicinity of spaced-apart recesses 9, as will be described in more detail below. Sealing elements 16 are included to prevent the escape of reinforcing material such as concrete, as will also be explained in more detail below.

The reinforcing element 1 are thus suspended at the height of the recesses 9 throughout the shell in horizontal annular planes of the shell and constitute stiffening or reinforcing rings on the shell. The suspension elements 7 may be fitted in place at the suspension locations 3 on the tower shell 4 from the lowermost step 22 of ladder 20. That ladder is moved higher as the process proceeds, since the reinforcing elements are typically added to the tower from the bottom portion to the top portion thereof. After each reinforcing element 1 is suspended on the tower shell by use of the suspension elements 7 (which attach to the reinforcing elements 1 by anchorages 19 includes therein), each pair of adjacent reinforcing elements have a reinforcing material applied thereto, such as concrete, which bonds to the adjacent reinforcing elements, joining them together, and also extends inwardly into the recesses 9, bonding the reinforcing elements to the tower shell 4. The reinforcing material may be applied by use of a ladder 24 (FIG. 2) without requiring use of the ladder or framework assembly 20.

FIGS. 3 to 6 provide a better understanding of the application of the reinforcing material just mentioned that connects together adjacent reinforcing elements 1 and also connects those elements to the tower shell 4. The reinforcing element 1 is typically rectangular in shape (when viewed from above in the tower as in FIG. 3). The reinforcing element 1 is constituted of a middle solid region 10 and trough-like ends 2 which may constitute upwardly open concrete shells. The lengthwise edge of the end regions 2 of the reinforcing element, adjacent to the tower shell 4, are curved, corresponding to the curvature of the tower shell. The middle solid region of the reinforcing element 1 is spaced from the tower shell 4 and is not connected thereto. Connection to the shell is only in the region of the trough-like ends 2 of the reinforcing element. The middle region 10 of the reinforcing element includes an upwardly open channel 18, which may have reinforcement rods therein. This channel communicates with the trough-like ends 2 so that when reinforcing material 5, such as concrete, is poured into the channel 18, it also fills the trough-like ends of the reinforcing element. Those trough-like ends 2 communicate with the spaced recesses 9, and the reinforcing material extends from the trough-like ends into the recesses, bonding or joining the reinforcing elements to the tower shell 4. Additionally, the reinforcing material 5 bonds one reinforcing element 1 to an adjacent reinforcing element. The sealing material 16, described above in connection with FIGS. 1 and 2, prevents the leakage of reinforcing material during this operation. The reinforcing material 5 thus extends for the entire length of the reinforcing element 1 parallel to the tower shell 4.

Figure 3:
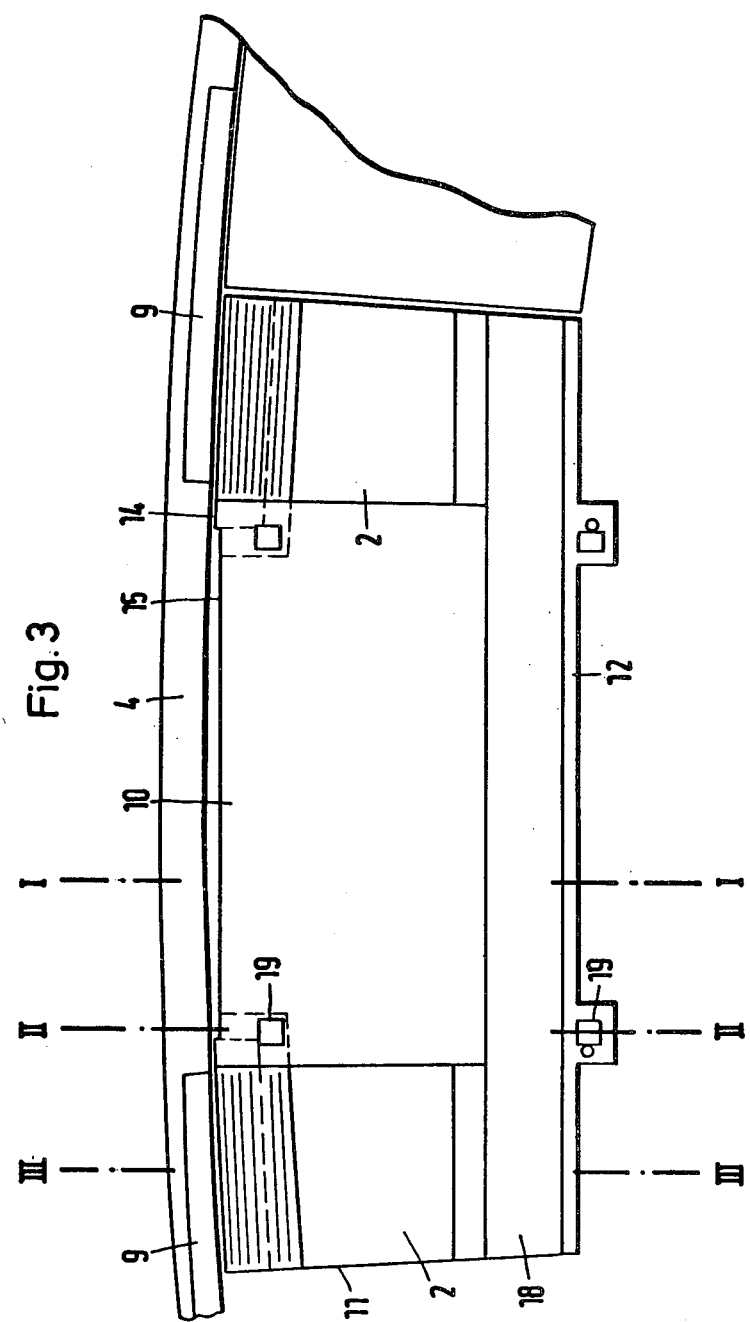
FIG. 3 is a view looking downwardly on a reinforcing element mounted on a tower shell.
Figure 4:
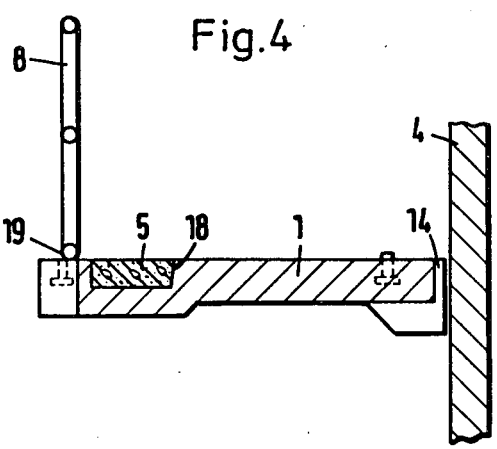
FIGS. 4, 5, and 6 are sectional views taken respectively along the sections I—I, II—II, and III—III in FIG. 3.
Figure 5:
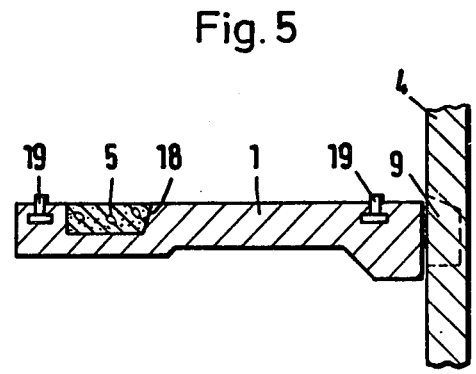
Figure 6:
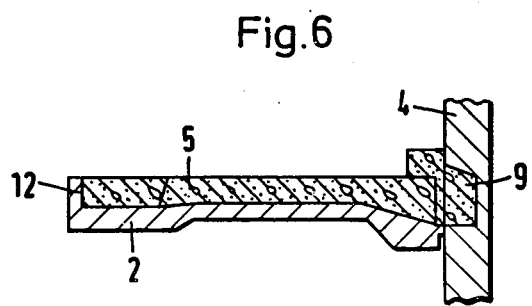

The length of the reinforcing element 1 (as viewed in FIG. 3) is such that it ends about at the middle of two adjacent, spaced recesses 9. These recesses preferably are uniformly spaced around the tower shell 4. With reference to FIG. 3, the edges 14 of the trough-like end portions 2 constitute projections extending toward the tower shell 4 (adjacent the corresponding inner edge 15 of the middle solid region 10 of the reinforcing element 1). Additionally, two pairs of anchorages 19 near the ends of the middle region 10 are provided for anchoring the suspension elements 7 (FIGS. 1 and 2) to the reinforcing element 1.

In summary, th preformed reinforcing element 1, after it is suspended by the suspension elements 7 on the shell 4 and sealed with a sealing material 16, is filled with reinforcing material such as concrete to fill the trough-like end portions 2, the channel 18 in the middle region 10 and the recesses 9 in the tower shell 4. A closed stiffening or reinforcing ring is produced in a horizontal plane around the tower from a number of reinforcement elements, connected one to another. That ring is connected intermittently to the shell 4 of the cooling tower in the vicinity of recesses 9, spaced about the tower in the plane. Any number of such annular stiffening rings may be so produced, as desired.

It will be apparent that the preferred embodiment described above is subject to being modified by those skilled in the art. Accordingly, the invention should be taken to be defined by the following claims.

We claim:

1. A pre-cast reinforcing element a cooling tower, in which a plurality of such reinforcing elements serve as forms for receiving a suitable reinforcing material that is bonded to the reinforcing elements and to the cooling tower at spaced points on the tower, said reinforcing element comprising a plate-like element having a middle solid region and trough-like ends each open at the top and a side thereof, in which an open top central channel is provided through said middle solid region communicating with said trough-like ends for receiving said reinforcing material such as concrete.

2. A pre-cast reinforcing element according to claim 1, including suspension elements thereon for suspending said reinforcing element from said cooling tower.

3. A pre-cast reinforcing element according to claim 1, including one or more elements for ensuring reliability of operation of the cooling tower mounted on said reinforcing element.

4. A cooling tower comprising an annular shell, a plurality of pre-cast reinforcing elements disposed in at least one horizontal plane within said shell adjacent to and suspended from the interior surface thereof, the pre-cast reinforcing elements in a plane abutting each other, and reinforcing material joining said pre-cast reinforcing elements one to another and joining said pre-cast reinforcing elements to said shell at spaced points thereon, in which each pre-cast reinforcing element comprises a plate-like element having a central channel through a middle solid region communicating with trough-like ends for receiving said reinforcing material, said shell including recesses therein ajdacent said trough-like ends, and said reinforcing material being located in said central channel and trough-like ends and recesses to achieve said joining of said pre-cast reinforcing elements to said shell and joining one pre-cast reinforcing element to another.

5. A pre-cast reinforcing element according to claim 1, which has two spaced longitudinal edges, and in which said central channel is located closer to one of said longitudinal edges than to the other.

6. A pre-cast reinforcing element according to claim 5, in which said trough-like ends extend from said one longitudinal edge to the other.

7. A pre-cast reinforcing element according to claim 6, in which said other longitudinal edge is indented along a central portion thereof to form projections adjacent said trough-like ends.

* * * * *

UNITED STATES PATENT AND TRADEMARK OFFICE
CERTIFICATE OF CORRECTION

PATENT NO. : 4,434,591

DATED : March 6, 1984

INVENTOR(S) : Wolfgang Zerna et al.

It is certified that error appears in the above-identified patent and that said Letters Patent is hereby corrected as shown below:

On the title page:

Item [62] of the printed patent, "Related U. S. Application Data" delete "abandoned" and insert -- Pat. No. 4,255,366 --.

Claim 1, line 1, after "element" the word --in-- should be inserted.

Signed and Sealed this

First Day of May 1984

[SEAL]

Attest:

GERALD J. MOSSINGHOFF

Attesting Officer

Commissioner of Patents and Trademarks